(12) United States Patent
Shenfield

(10) Patent No.: US 7,706,368 B2
(45) Date of Patent: Apr. 27, 2010

(54) SYSTEM AND METHOD FOR CORRELATING MESSAGES WITHIN A WIRELESS TRANSACTION

(75) Inventor: Michael Shenfield, Richmond Hill (CA)

(73) Assignee: Research In Motion Limited, Waterloo (CA)

(*) Notice: Subject to any disclaimer, the term of this patent is extended or adjusted under 35 U.S.C. 154(b) by 280 days.

(21) Appl. No.: 11/697,352

(22) Filed: Apr. 6, 2007

(65) Prior Publication Data

US 2008/0247390 A1 Oct. 9, 2008

(51) Int. Cl.
*H04L 12/28* (2006.01)
*H04L 12/56* (2006.01)

(52) U.S. Cl. ........................ 370/389; 370/392
(58) Field of Classification Search ............ 707/2; 370/352, 353, 401, 389, 392; 709/220, 213, 709/224, 227
See application file for complete search history.

(56) References Cited

U.S. PATENT DOCUMENTS

| 5,430,719 | A | * | 7/1995 | Weisser, Jr. | 370/389 |
| 5,982,893 | A | * | 11/1999 | Hughes | 705/75 |
| 6,411,604 | B1 | * | 6/2002 | Brockman et al. | 370/244 |
| 7,283,988 | B1 | * | 10/2007 | Peterson | 707/2 |
| 7,421,501 | B2 | * | 9/2008 | Critchley et al. | 709/227 |
| 7,441,008 | B2 | * | 10/2008 | Johnson | 709/213 |
| 2004/0117801 | A1 | * | 6/2004 | Eibach et al. | 719/314 |

FOREIGN PATENT DOCUMENTS

| EP | 1694025 | 8/2006 |
| WO | 0217576 | 2/2002 |

OTHER PUBLICATIONS

European Examiner's Report pursuant to Article 94(3) EPC, EP 07105907.5, dated Nov. 7, 2008.
EP07105907, European Extended Search Report dated Jul. 18, 2007.
EP07105907, European Communication pursuant to Article 94(3) EPC dated Feb. 4, 2008.
Australian Patent Application No. 2008201243, Examiner's Report dated Jun. 12, 2009.
Korean Patent Application No. 10-2008-0031234, Examiner's Report dated Sep. 22, 2009.
Bin Hu, "Transaction Management", submitted to Content Distribution Working Group, Mar 6, 2007 (OMA-CD-2007-0068R02-INP_Transaction_Management.ppt).
Bin Hu, "Transaction Management", submitted to Content Distribution Working Group, Mar 6, 2007 (OMA-CD-2007-0068R01-INP_Transaction_Management.ppt).
Bin Hu, "DCD-3 Interface—Application Registration", submitted to CD—DCD, Apr. 3, 2007 (OMA-CD-2007-0097-INP_TS_DCD_Semantics_Section_07_1_3_DCD_3_Application_Registration.doc).

* cited by examiner

*Primary Examiner*—Ayaz R Sheikh
*Assistant Examiner*—Chuong T Ho
(74) *Attorney, Agent, or Firm*—Moffat & Co.

(57) ABSTRACT

A method and system for correlating messages within a wireless transaction, each of the messages requiring a unique message identifier, the method having the steps of: creating a transaction identifier, the transaction identifier being the same for related messages; and adding to the transaction identifier a message index, the message index corresponding to a number of a message within a transaction, whereby the transaction identifier and message index form the unique message identifier for each of the messages.

21 Claims, 5 Drawing Sheets

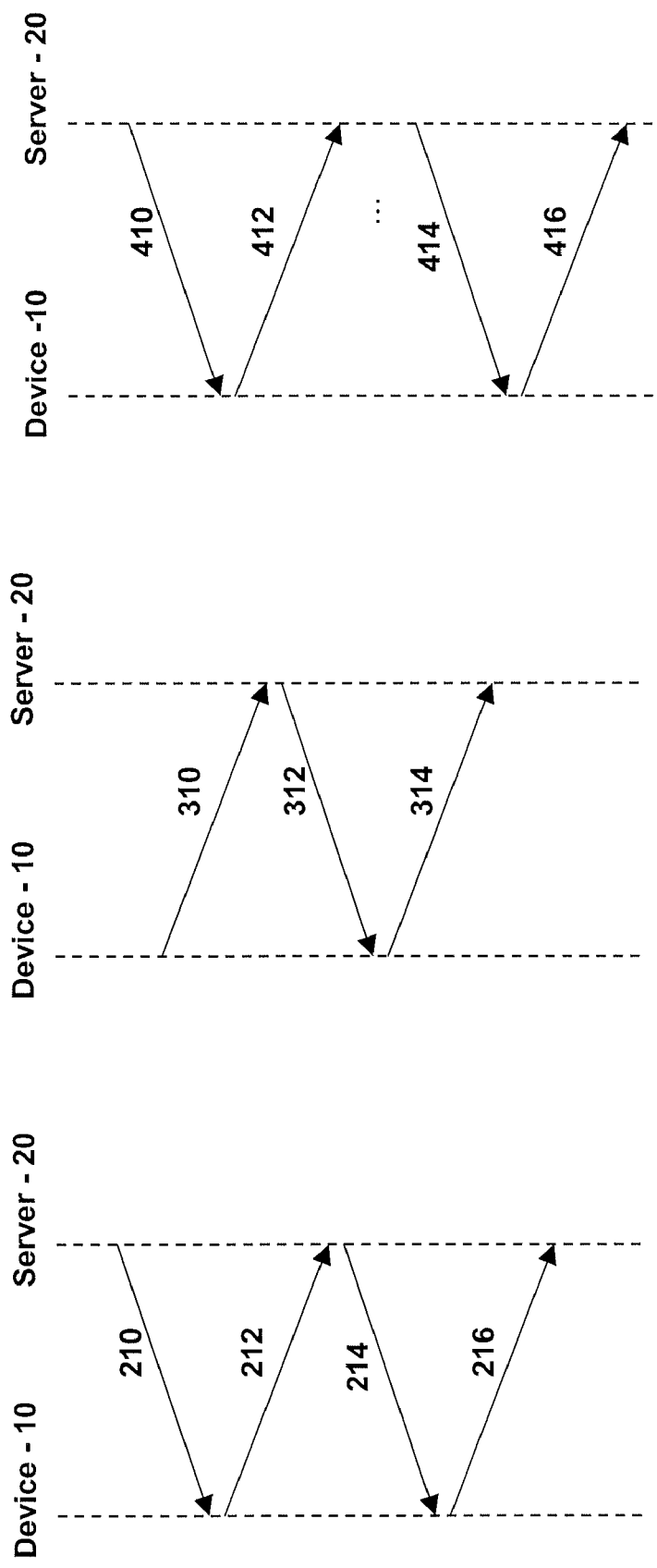

SYSTEM AND METHOD FOR CORRELATING MESSAGES WITHIN A WIRELESS TRANSACTION

FIELD OF THE DISCLOSURE

The present disclosure relates to efficient communications of messages and transactions in an asynchronous communications environment and in particular to correlation of messages in a wireless network.

BACKGROUND

In a wireless communications environment, messages are sent between a wireless device and a network element such as a server. These messages typically include a unique identifier to identify the message. This unique identifier is hereinafter called the "message id".

In addition, a message will typically include a field identifying the message type in order to allow either the wireless device or the network element to more easily interpret the message.

Messages themselves can often be grouped into a logical group of discrete messages between the device and the network element. For example, an outbound message may somehow correlate to a subsequently received inbound message. The logical group of discreet messages between the device and the server form a transaction. It is often desirable to correlate the messages within a transaction.

In wireless communications message ordering is, however, often asynchronous. Thus, for example, multiple outbound messages can be sent and the inbound messages can be received in an order that is different from the order in which the outbound messages were sent. In order to overcome this, a typical solution is to use a transaction identifier field in every message. This field is added in addition to the message identifier and message type fields. The addition of a transaction identifier field is, however, problematic because the transaction identifier needs to be large enough to distinguish it from other transaction identifiers and thus the overhead in terms of network resources for adding a transaction identifier field to every message is quite large.

BRIEF DESCRIPTION OF THE DRAWINGS

The present application will be better understood with reference to the drawings in which:

FIG. 2 is a flow diagram of a typical content delivery transaction for a pull based content delivery with pushed content availability notification;

FIG. 3 is a flow diagram illustrating a pull type delivery transaction;

FIG. 4 is a flow diagram illustrating a push content delivery transaction;

DETAILED DESCRIPTION

Figure 1:
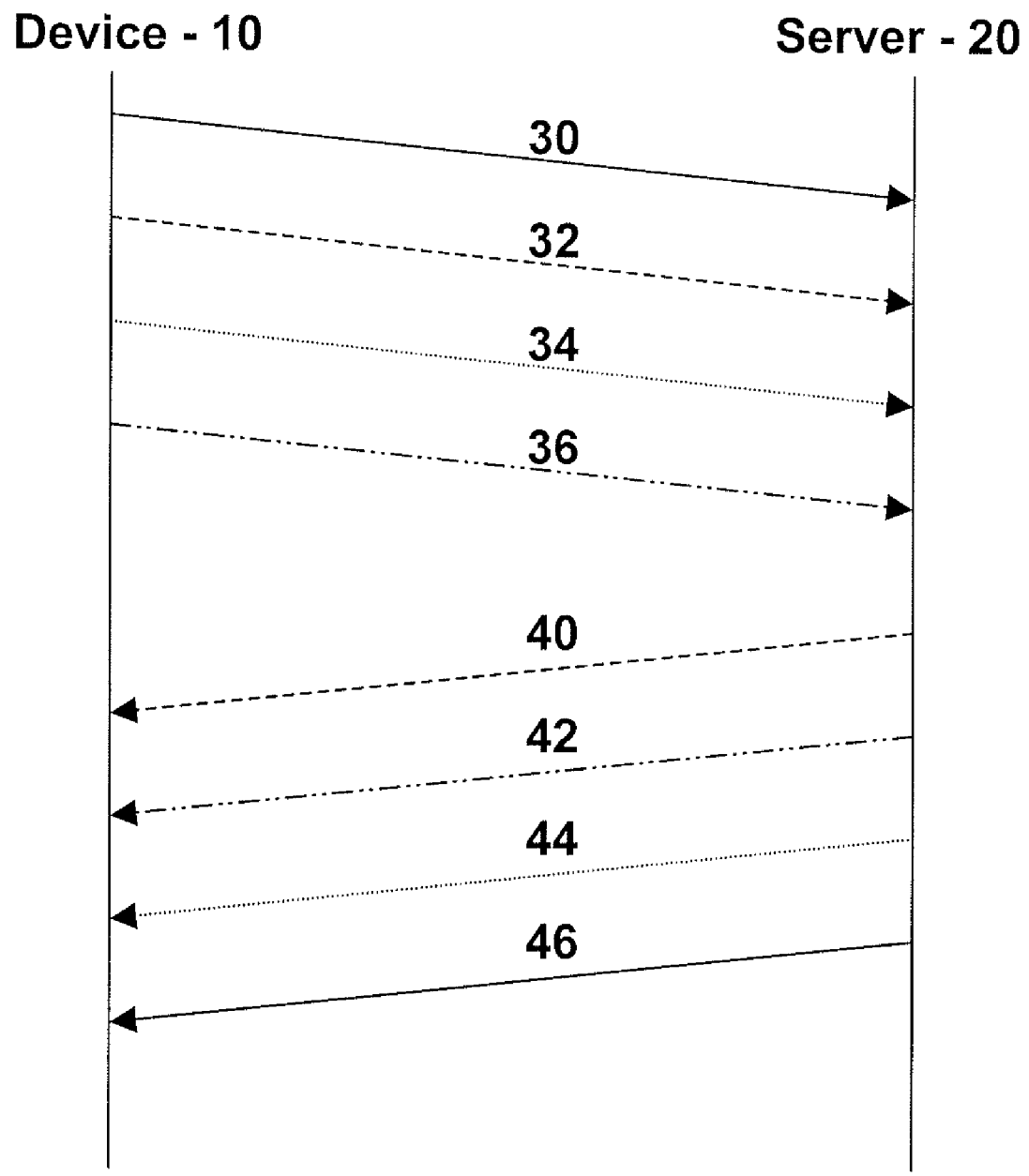
FIG. 1 is a flow diagram illustrating the asynchronous nature of wireless communications.

The present system and method overcome the disadvantages of the prior art by constructing a message identifier field as a combination of a transaction identifier and a message index. This provides an advantage that a globally or locally unique message identifier field is still provided, while reducing message size, thereby saving network capacity.

In a further aspect, a transaction type can be identified for the transaction through several mechanisms. A first mechanism is the addition to the message identifier of a transaction type index.

A second mechanism is the use of the message index of a first message in a transaction to specify a transaction type. A mobile device and network element will recognize a new transaction identifier and thus ignore the message index, since this is assumed to be the first message within the transaction. The index field is replaced with the transaction type index and thus can be used to identify the transaction type of the message.

A third mechanism is the use of heuristics to identify a transaction type. Specifically, the message size, the radio bearer used, or other feature of the message could be used to preliminarily identify the transaction type. If it is subsequently discovered that the assignment of the transaction type is incorrect due the transaction type could then be re-assigned.

A fourth mechanism could be that no transaction type is present, but a message includes message type information. As will be appreciated, the message type of a first message in a transaction will often uniquely identify the transaction.

The identification of the transaction type also provides for tracking of message types within the transaction. Specifically, a transaction has a limited number of message types that are expected in a specific order, and thus by tracking a transaction the next message type can be derived. This results in the elimination of the need to have a separate message type field if the transaction type can be identified from the message identifier.

The present disclosure therefore provides a method for correlating messages within a wireless transaction, each of said messages requiring a unique message identifier, the method comprising the steps of: creating a transaction identifier, said transaction identifier being the same for related messages; and adding to the transaction identifier a message index, said message index corresponding to a number of a message within a transaction, whereby said transaction identifier and message index form the unique message identifier for each of said messages.

The present disclosure further provides a message identifier adapted to correlate messages within a wireless transaction, the message identifier comprising: a transaction identifier, said transaction identifier being the same for related messages; and a message index, said message index corresponding to a number of a message within a transaction.

The present disclosure further provides a method for processing correlated messages within a wireless transaction comprising the steps of: receiving a message having a message identifier comprising a transaction identifier, said transaction identifier being the same for related messages, and a message index corresponding to a number of the message within a transaction; extracting from said message identifier the transaction identifier; and checking whether said transaction identifier is known, if no: creating a transaction record for the transaction identifier; and checking whether a transaction type is available, if yes updating the transaction record; and processing the message based on the transaction record.

The present disclosure still further provides a network element for processing correlated messages within a wireless network comprising: a protocol data storage, said protocol data storage storing message types and sequences for each transaction type of a plurality of transaction types; and a transaction state storage storing transaction records for existing transactions; and a message processor, said message processor adapted to: receive a message having a message identifier comprising a transaction identifier, said transaction identifier being the same for related messages, and a message index corresponding to a number of the message within a transaction; extract from said message identifier the transaction identifier; check from said transaction state storage whether said transaction identifier is known, if no: create in the transaction state storage a transaction record for the transaction identifier; and check whether a transaction type is available, if yes updating the transaction record; and process the message based on the transaction record.

Reference will now be made to FIG. 1. FIG. 1 illustrates an exemplary flow diagram for communications between a device 10 and a server 20. The example of FIG. 1 is meant to be illustrative of communications between a device 10 and server 20 and does not limit the present disclosure.

A device 10 may send various messages to server 20. In the example of FIG. 1, messages 30, 32, 34 and 36 are sent to server 20. Each of messages 30, 32, 34 and 36 pertain to a different matter and thus are illustrated in FIG. 1 with different line type. Examples of messages 30, 32, 34 or 36 could be content requests, confirmations of content receipt, requests for additional content, a content response, among others.

Device 10 may send numerous messages such as messages 30, 32, 34 and 36 to server 20. However, due to the asynchronous nature of wireless communications, the response from server 20 to device 10 based on messages 30, 32, 34 and 36 may not correspond in order to the order in which server 20 received messages 30, 32, 34 and 36.

In the example of FIG. 1, a response 40 that relates to message 32 is received at device 10 first. Subsequently, a response 42 is received by device 10 relating to message 36.

In the example of FIG. 1, a response 44 is next received that corresponds to a message 34. Finally, a response 46 is received which corresponds to message 30.

An issue with the above is how a device correlates message 30 to response 46, message 32 to response 40, message 34 to response 44, and message 36 to response 42. As used herein, messages 30 and response 46 are part of the same transaction. Similarly, message 32 and response 40 are part of the same transaction; message 34 and response 44 are part of the same transaction; and message 36 and response 42 are part of the same transaction, where each of the four transactions is unique from each other.

The solution to the above is to construct a message identifier field as a combination of the transaction identifier and a message number or index within the transaction. This can be illustrated:

[Transaction identifier] [Message index]

As will be appreciated by those skilled in the art, the combination of a transaction identifier and message index provides for savings of network resources. Specifically, the transaction identifier needs to be unique. Unique here could be defined as a globally unique value or a unique value within a context such as a carrier domain, device, server, service, channel, among others. Also, as will be appreciated by those skilled in the art, unique may not necessarily mean completely unique, but statistically having a low probability of having the same value as another transaction identifier.

Since the message identifier also needs to be unique, the combination of the unique transaction identifier with an index for a message within the transaction provides a unique message identifier. The elimination of one unique value saves resources, since a unique value requires a significant number of bytes in every message to be implemented.

Thus, for example, if the transaction identifier is "1234", a message index could be added after the transaction identifier. The message index could be, for example, 01 and thus the message identifier is "123401". As will be appreciated by those skilled in the art, this forms a much shorter identifier to identify both the transaction and the message.

The example of "1234" above is merely a simplification and in practice, the number of bytes required to make a globally carrier domain, device, server, service, or channel, among others, unique identifiers will need to be used. Such an identifier can, for example, be generated with a random number generator based on a time stamp at the device or the server.

The message index from above can be very small. For example, wireless transactions are typically short and usually require less than 16 messages. Thus, the message index could be two to four bits added to the transaction identifier. This is, however, meant to be illustrative of an example of a message index and is not meant to be limiting. Other message index sizes could be used and would be apparent to those skilled in the art.

The above provides the advantage that the transaction identifier, which typically may be between 32 and say 256 bytes, does not need to be added to a separate message identifier, which also could be 32 to 256 bytes. Thereby, overhead is saved.

In a further aspect, the single message identifier field having a transaction identifier and message index can be used to replace the transaction identifier, message identifier and preferably the message type field.

In particular, in a content delivery framework the transaction types are predefined, so the types of messages participating in the transaction are also predefined. Moreover, the order of these messages within the transaction is predefined as well.

This will be illustrated in more detail with reference to FIGS. 2, 3, and 4.

Referring to FIG. 2, a flow diagram is illustrated for a typical pushed notification with pulled content system.

In FIG. 2, a device 10 and a server 20 communicate with each other. The transaction in the example of FIG. 2 illustrates a first message 210, which is a notification to device 10 that content is available. In response, device 10 sends a message 212 to server 20 containing a content request to obtain the content that is available.

The server then, in message 214, sends a content response.

The device 10 then optionally sends a confirmation 216.

As will be appreciated, messages 210, 212, 214 and 216 form a transaction for a pushed notification with pulled content system. The type of transaction defines the type of messages and the order of these messages.

Also, in the event of an error for any of messages 210, 212 or 214, an error message could be sent at steps 212, 214 or 216 instead of the messages defined above.

Referring to FIG. 3, a pull system is provided. In the example of FIG. 3, a device 10 communicates with server 20. A first message 310 is sent from device 10 to server 20 and forms a content request.

In response to message 310, server 20 sends a message 312 providing a content response. Device 10 may then optionally send a confirmation message 314.

As with the above example of FIG. 2, messages 310, 312 and 314 of FIG. 3 form a single transaction. Further, based on the transaction type, the messages in the transaction are predetermined and the order of the messages is predetermined.

As will further be appreciated by those skilled in the art, in the event of an error in messages 310 or 312, an error message can be sent instead of messages 312 or 314.

Referring to FIG. 4, this figure illustrates an exemplary flow diagram for a push system. In the example of FIG. 4, content itself is pushed to a device 10, rather than merely a notification of content, as in the example of FIG. 2.

In FIG. 4, a device 10 communicates with a server 20. Server 20 can, in message 410, send content or part of content to device 10.

In response, device 10 may optionally send a confirmation in message 412. Alternatively, device 10 could send a request for additional content or an error message in message 412.

The server 20 could then, when content becomes available or if a request for additional content is received, send more content in message 414. This could for example be used for content fragmentation where a device has space limitations or the push bearer has size limitations. In message 416, the device may optionally confirm receipt of content, request additional content or send an error message.

As with the above examples of FIG. 2 and FIG. 3, messages 410 and 412 in FIG. 4 form a single transaction. Further, if message 412 is a request for additional content, then message 414 and 416 could also form part of this same transaction. In one embodiment, a message index could reset after reaching a maximum. Thus for example, if 16 messages are part of the transaction, the message index could go back to zero after the fifteenth message.

Based on the transaction type, the message types for messages 410 and 412 are known and further, the order of the messages 410 and 412 are known.

The proposed use of a transaction identifier and a message number or index within the transaction allows for the identification of the types of messages participating in the transaction, since in a transaction the message type and ordering are predefined.

In particular, various options exist in order to uniquely identify a transaction type.

In a first option the transaction type may be embedded in the transaction identifier of a message identifier. This results only in the requirement that a second subset to identify a message index exist within the transaction. Specifically, if a device can receive sixteen types of transactions, then the transaction type could be four bits added somewhere within the transaction identifier. Thus, for example, the transaction identifier could be extended by adding a transaction type index at the beginning of the transaction identifier. This is illustrated as:

[transaction identifier][message index]

where the transaction identifier subset of the message identifier contains the transaction type.

However, this is not meant to be limiting and the transaction type can be added anywhere within the transaction identifier field. Further various forms of combining the two would be known to those skilled in the art.

A second option is if the transaction type is not embedded in the transaction identifier subset of the message identifier field. Instead, when a device or a server receives a transaction number that a device or server has not seen before, this will typically be interpreted as the first message within the transaction. Thus, instead of adding a transaction type separately from a message index, the message index for the first message within a transaction should identify the transaction type. It will be understood by the device or the server that the message index identifies a transaction type and that the message is the first message in the transaction.

This second option is illustrated for a first message in a transaction where the message identifier is:

[transaction identifier][transaction type index]

And for subsequent messages in the transaction the message identifier is:

[transaction identifier][message index]

Thus consecutive messages within the transaction carry a message index within the message portion of the identifier.

A third option is that the transaction type is not embedded in the transaction identifier subset of the message identifier. In most cases, the type of the first message within the transaction uniquely identifies the transaction type. The decision on the transaction type and the anticipated sequences of messages within the transaction could be made dynamically upon processing the first message. Alternatively, the transaction type could be identified based on the radio bearer or interface that was used to deliver the message, the size of the message, among others. For example, the size of the message could be used to distinguish between pushed content and a pushed notification of content availability messages, thus separating transactions shown in FIG. 2 and FIG. 4. This example still requires only a message index for a message subset of the identifier field. This is illustrated as:

[transaction identifier][message index]

The use of heuristics above allows for the identification of the tier of the processing structure where the message will be processed. In this case, even if the heuristics are wrong and it is discovered that the message has been processed at the wrong tier, the message could then be re-processed at the correct tier resulting in a minor delay for that message. Overall, however, a time savings will be achieved by using these types of heuristics.

A fourth option is that the transaction identifier does not contain information about the transaction type. In this case, message type information is included in the message subset. This is illustrated as;

[transaction identifier][message subset]

The message subset is for example illustrated as:

[message index][message type]

Figure 5:
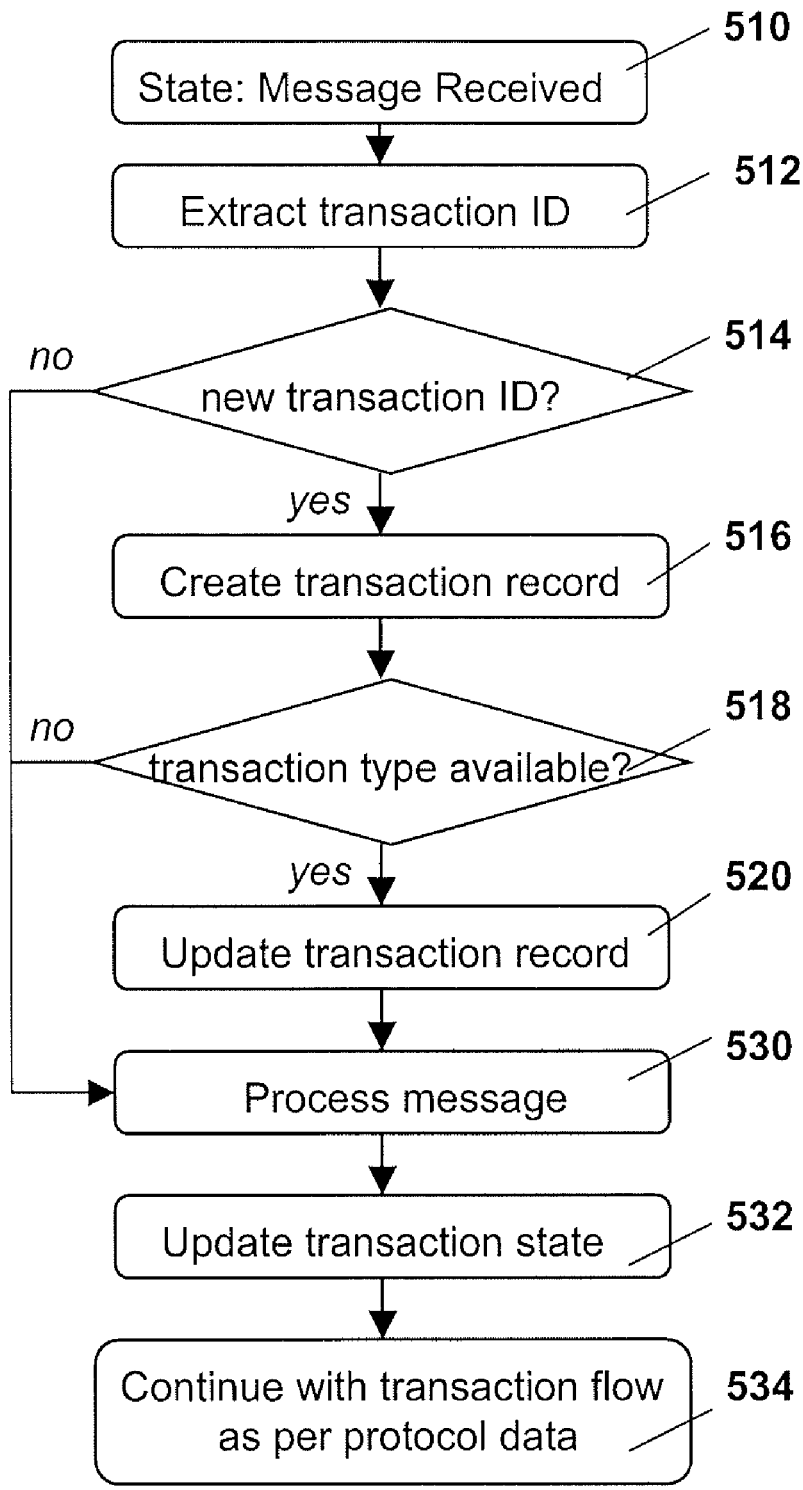
FIG. 5 is a flow diagram illustrating an exemplary method for utilizing the combined transaction identifier and message index.

The above use of transaction types is further show with reference to FIG. 5. FIG. 5 illustrates a flow chart of an exemplary method for utilizing the combined transaction and message identifiers. In the example of FIG. 5, the method starts at step 510 when a message is received. The method then proceeds to step 512 in which the transaction identifier is extracted from the received message.

The method then proceeds to step 514 in which a device or server checks to see whether the transaction identifier that was extracted in step 512 is a new transaction identifier. As will be appreciated by those skilled in the art, the device or server (for example device 10 or server 20 from FIG. 1, 2, 3 or 4) will store transaction identifiers and if a transaction identifier is received that does not match any of the stored transaction identifiers, then this will be considered to be a new transaction identifier for step 514.

From step 514, if a new transaction identifier is identified, then the process proceeds to step 516 in which a transaction record is created and stored on the device or server.

From step 516, the process then proceeds to step 518 in which a check is made to see whether or not a transaction type is available. Step 518 could use various options such as those taught above to identify the transaction type. This could include, for example, extracting the transaction type field from a transaction if a discreet transaction type field is added to the identifier field. Alternatively, since this may be the first message, the message index could be replaced by a transaction type index to identify the transaction type. In a further alternative, a heuristics model could be used to identify the transaction type. In a further alternative, a message type may be used to identify the transaction type.

From step 518, if the transaction type is available, the process then proceeds to step 520 in which a transaction record is updated to include the transaction type.

The process proceeds to step 530 from step 514 if the transaction identifier is not new, from step 518 if the transaction type is not available, or from step 520. In step 530, the message that was received in step 510 is processed.

The process then proceeds to step 532 in which the transaction state is updated. For example, if utilizing the transaction type of FIG. 2, once the content availability message has been received, the transaction state could indicate that the next message expected at the device is a request to be sent to retrieve the content. As would be appreciated, each transaction has a specific protocol with messages and message ordering that are used.

The process proceeds from step 532 to step 534 in which the device or the server continue with transaction flow as per protocol data.

As will be appreciated by those skilled in the art, the example FIG. 5 is merely illustrative of one method that we used to extract information including a transaction identifier called a transaction type message type and message identifier from a received message. Other examples will be apparent to those skilled in the art.

Figure 6:
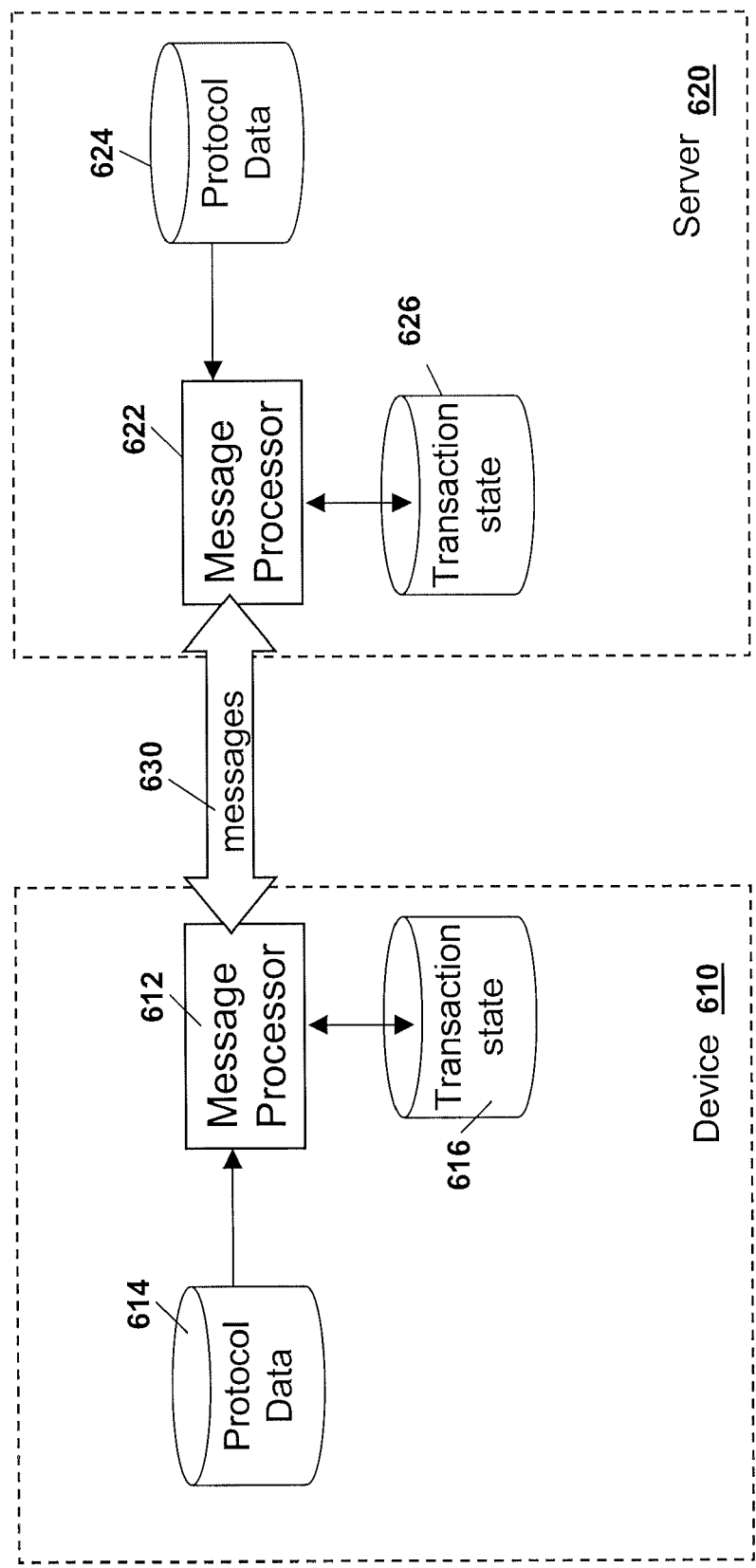
FIG. 6 is a block diagram of a simplified system used for the method of the present disclosure.

Referring to FIG. 6, FIG. 6 illustrates a block diagram of a typical system. In the system, a device 610 communicates with a server 620. Device 610 includes a message processor 612 adapted to process received messages.

Message processor 612 communicates with a protocol data storage 614. Protocol data storage 614 stores the various protocols that device 610 expects. These protocols include the transaction progressions as, for example, illustrated by FIGS. 2, 3 and 4.

Message processor 612 further communicates with a transaction state storage 616 which stores the current state of the various transactions that device 610 is involved with. Thus, for example, if the device is progressing through a transaction such as that illustrated in FIG. 2 and has received a first message from the server providing a notification of content availability along with a transaction identifier, and has then sent a content request using the same transaction identifier, transaction state storage 616 may indicate that in the next message associated with that transaction identifier should be a content response from server 620.

Similarly, server 620 includes a message processor 622 adapted to process messages that are received. Further, a protocol data storage 624 includes various protocols that the server can adopt to communicate with a device 610, or which server 620 can use when communicating with device 610.

Server 620 further includes a transaction state storage 626 to identify the current state of the various transactions that server 620 is involved with. In this way, messages 630 are passed between device 610 and server 620.

As will be appreciated by those skilled in the art, device 10 from FIGS. 1, 2, 3 and 4, and device 610 from FIG. 6 can be any mobile device. One exemplary mobile device is illustrated in FIG. 7.

Figure 7:
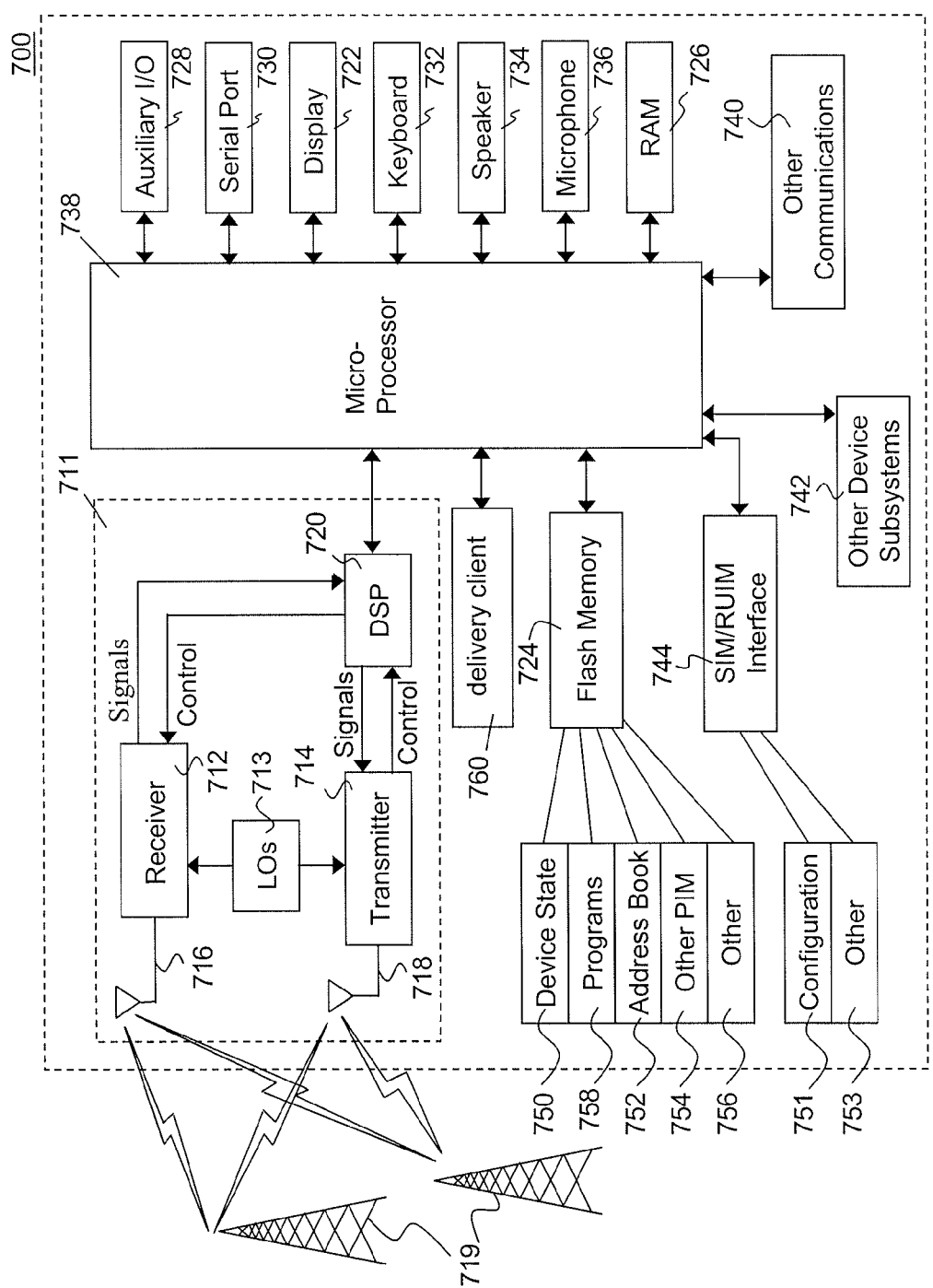
FIG. 7 is a block diagram of an exemplary mobile device that could be used with the present method and system.

FIG. 7 is a block diagram illustrating a mobile station apt to be used with preferred embodiments of the apparatus and method of the present disclosure. Mobile station 700 is preferably a two-way wireless communication device having at least voice and data communication capabilities. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 700 is enabled for two-way communication, it will incorporate a communication subsystem 711, including both a receiver 712 and a transmitter 714, as well as associated components such as one or more, preferably embedded or internal, antenna elements 716 and 718, local oscillators (LOs) 713, and a processing module such as a digital signal processor (DSP) 720. As will be apparent to those skilled in the field of communications, the particular design of the communication subsystem 711 will be dependent upon the communication network in which the device is intended to operate.

Network access requirements will also vary depending upon the type of network 719. In some CDMA networks network access is associated with a subscriber or user of mobile station 700. A CDMA mobile station may require a removable user identity module (RUIM) or a subscriber identity module (SIM) card in order to operate on a CDMA network. The SIM/RUIM interface 744 is normally similar to a card-slot into which a SIM/RUIM card can be inserted and ejected like a diskette or PCMCIA card. The SIM/RUIM card can have approximately 64K of memory and hold many key configuration 751, and other information 753 such as identification, and subscriber related information.

When required network registration or activation procedures have been completed, mobile station 700 may send and receive communication signals over the network 719. As illustrated in FIG. 7, network 719 can consist of multiple base stations communicating with the mobile device. For example, in a hybrid CDMA 1x EVDO system, a CDMA base station and an EVDO base station communicate with the mobile station and the mobile station is connected to both simultaneously. The EVDO and CDMA 1x base stations use different paging slots to communicate with the mobile device.

Signals received by antenna 716 through communication network 719 are input to receiver 712, which may perform such common receiver functions as signal amplification, frequency down conversion, filtering, channel selection and the like, and in the example system shown in FIG. 7, analog to digital (A/D) conversion. A/D conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 719 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Mobile station 700 preferably includes a microprocessor 738 which controls the overall operation of the device. Communication functions, including at least data and voice communications, are performed through communication subsystem 711. Microprocessor 738 also interacts with further device subsystems such as the display 722, flash memory 724, random access memory (RAM) 726, auxiliary input/output (I/O) subsystems 728, serial port 730, one or more keyboards or keypads 732, speaker 734, microphone 736, other communication subsystem 740 such as a short-range communications subsystem and any other device subsystems generally designated as 742. Serial port 730 could include a USB port or other port known to those in the art.

Some of the subsystems shown in FIG. 7 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the microprocessor 738 is preferably stored in a persistent store such as flash memory 724, which may instead be a read-only memory (ROM) or similar storage element (not shown). Those skilled in the art will appreciate that the operating system, specific device applications, or parts thereof, may be temporarily loaded into a volatile memory such as RAM 726. Received communication signals may also be stored in RAM 726.

As shown, flash memory 724 can be segregated into different areas for both computer programs 758 and program data storage 750, 752, 754 and 756. These different storage types indicate that each program can allocate a portion of flash memory 724 for their own data storage requirements. Microprocessor 738, in addition to its operating system functions, preferably enables execution of software applications on the mobile station. A predetermined set of applications that control basic operations, including at least data and voice communication applications for example, will normally be installed on mobile station 700 during manufacturing. Other applications could be installed subsequently or dynamically.

A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 719. In a preferred embodiment, the PIM data items are seamlessly integrated, synchronized and updated, via the wireless network 719, with the mobile station user's corresponding data items stored or associated with a host computer system. Further applications may also be loaded onto the mobile station 700 through the network 719, an auxiliary I/O subsystem 728, serial port 730, short-range communications subsystem 740 or any other suitable subsystem 742, and installed by a user in the RAM 726 or preferably a non-volatile store (not shown) for execution by the microprocessor 738. Such flexibility in application installation increases the functionality of the device and may provide enhanced on-device functions, communication-related functions, or both. For example, secure communication applications may enable electronic commerce functions and other such financial transactions to be performed using the mobile station 700.

In a data communication mode, a received signal such as a text message or web page download will be processed by the communication subsystem 711 and input to the microprocessor 738, which preferably further processes the received signal for output to the display 722, or alternatively to an auxiliary I/O device 728. A delivery client 760, which could be equivalent to delivery client 140 could also process the input.

A user of mobile station 700 may also compose data items such as email messages for example, using the keyboard 732, which is preferably a complete alphanumeric keyboard or telephone-type keypad, in conjunction with the display 722 and possibly an auxiliary I/O device 728. Such composed items may then be transmitted over a communication network through the communication subsystem 711.

For voice communications, overall operation of mobile station 700 is similar, except that received signals would preferably be output to a speaker 734 and signals for transmission would be generated by a microphone 736. Alternative voice or audio I/O subsystems, such as a voice message recording subsystem, may also be implemented on mobile station 700. Although voice or audio signal output is preferably accomplished primarily through the speaker 734, display 722 may also be used to provide an indication of the identity of a calling party, the duration of a voice call, or other voice call related information for example.

Serial port 730 in FIG. 7 would normally be implemented in a personal digital assistant (PDA)-type mobile station for which synchronization with a user's desktop computer (not shown) may be desirable, but is an optional device component. Such a port 730 would enable a user to set preferences through an external device or software application and would extend the capabilities of mobile station 700 by providing for information or software downloads to mobile station 700 other than through a wireless communication network. The alternate download path may for example be used to load an encryption key onto the device through a direct and thus reliable and trusted connection to thereby enable secure device communication. As will be appreciated by those skilled in the art, serial port 730 can further be used to connect the mobile device to a computer to act as a modem.

Other communications subsystems 740, such as a short-range communications subsystem, is a further optional component which may provide for communication between mobile station 700 and different systems or devices, which need not necessarily be similar devices. For example, the subsystem 740 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for correlating messages defining a content delivery delivery transaction, the method being performed by a processor of a network element and comprising:
    receiving an incoming message having a received message identifier, the received message identifier including, in a single field, a unique transaction identifier suffixed by a message index value of the incoming message and within the content delivery transaction;
    extracting from said received message identifier the unique transaction identifier;
    checking whether said unique transaction identifier is known; if no:
    creating a transaction record for the unique transaction identifier; and
    determining whether to update the transaction record based on the message index value indicating at least one of a transaction type and that the incoming message is a first message in the content delivery transaction;

processing the incoming message based on the transaction record; and associating subsequent messages of the content delivery transaction with subsequent message identifiers, the subsequent message identifiers including said unique transaction identifier suffixed by subsequent message index values, the subsequent message index values corresponding to message sequence numbers of the subsequent messages within said content delivery transaction.

2. The method of claim 1, wherein at least one of the associating steps comprises deriving the received or subsequent message identifiers from a transaction type.

3. The method of claim 1, wherein the message index value for the message that initiates the content delivery transaction identifies a transaction type.

4. The method of claim 1 further comprising replacing the message index with a transaction type in said content delivery transaction initiating message.

5. The method of claim 1, further comprising creating a transaction record for said unique transaction identifier in a transaction state storage of said network element.

6. The method of claim 1, wherein checking whether the transaction type is available includes deriving the transaction type heuristically.

7. The method of claim 6, wherein deriving the transaction type heuristically is based on one of a size of the message, a bearer employed to convey the message and an interface employed to convey the message.

8. The method of claim 1, wherein said message identifier further includes a message type index.

9. The method of claim 1, wherein each transaction type corresponds to a limited set of message types, the processing step employing the transaction type to derive a message type.

10. The method of claim 9, further comprising the step of storing a transaction state in a transaction state storage of said network element, said transaction state being derived from the message sequence within of the transaction type.

11. The method claim 1, wherein at least one of said unique transaction identifier, said message identifier, and said received or subsequent message identifiers, is one of unique globally and unique within a context including one of a carrier domain, a device, a server, a service, and a channel.

12. A network element of a wireless network for correlating messages defining a content delivery transaction, the network element comprising:

a processor configured to cause the network element to:

receive an incoming message having a unique received message identifier the received message identifier including, in a single field, a unique transaction identifier suffixed by a message index value of the incoming message within the content delivery transaction;

extract from said received message the unique transaction identifier;

check whether said unique transaction identifier is known, if no:

create a transaction record for the unique transaction identifier and determine whether to update the transaction record based on the message index value indicating at least one of a transaction type and that the incoming message is a first message in content delivery transaction;

process the incoming message based on the transaction record; and associate subsequent messages of the content delivery transaction with subsequent message identifiers, the subsequent message identifiers including said unique transaction identifier suffixed by subsequent message index values, the subsequent message index values corresponding to message sequence numbers of the subsequent messages within said content delivery transaction.

13. The network element of claim 12, wherein said message identifier further comprises an index containing the transaction type.

14. The network element of claim 12, further comprising a transaction type index in the message initiating the transaction.

15. The network element of claim 12, wherein the processor is configured to derive the transaction type heuristically.

16. The network element of claim 15, wherein the heuristic derivation is based on one of a size of the message, a bearer used to deliver the message and an interface used to deliver the message.

17. The network element of claim 12, wherein said message identifier further includes a message type index.

18. The network element of claim 12, wherein at least one of said unique transaction identifier, said message identifier, and said received or subsequent message identifiers, is one of unique globally and unique within a context including one of a carder domain, a device, a server, a service, and a channel.

19. The network element of claim 12, wherein each transaction type corresponds to a limited set of message types, said processor deriving a message type from the transaction type.

20. The network element of claim 19, wherein the processor is further configured to store a transaction state for each transaction, said processor deriving said transaction stated from the message sequence within the transaction type.

21. The network element of claim 12, wherein the network element is one of a wireless device, a content delivery client, a server and a content delivery server.

* * * * *